(12) United States Patent
Yokoshima et al.

(10) Patent No.: US 11,359,515 B2
(45) Date of Patent: Jun. 14, 2022

(54) STEAM VALVE DRIVING APPARATUS, STEAM VALVE APPARATUS, AND STEAM TURBINE PLANT

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Kazuhiro Yokoshima, Yokohama Kanagawa (JP); Osamu Shindo, Yokohama Kanagawa (JP)

(73) Assignees: KABUSHIKI KAISHA TOSHIBA, Tokyo (JP); TOSHIBA ENERGY SYSTEMS & SOLUTIONS CORPORATION, Kanagawa (JP)

(*) Notice: Subject to any disclaimer, the term of this patent is extended or adjusted under 35 U.S.C. 154(b) by 278 days.

(21) Appl. No.: 16/812,679

(22) Filed: Mar. 9, 2020

(65) Prior Publication Data

US 2020/0362729 A1    Nov. 19, 2020

(30) Foreign Application Priority Data

May 14, 2019    (JP) .............................. JP2019-091646

(51) Int. Cl.
*F01D 25/32*    (2006.01)
*F16K 31/122*    (2006.01)
*F01D 1/00*    (2006.01)

(52) U.S. Cl.
CPC .............. *F01D 25/32* (2013.01); *F01D 1/00* (2013.01); *F16K 31/1221* (2013.01)

(58) Field of Classification Search
CPC .......... F01D 25/32; F01D 1/00; F01D 17/145; F16K 31/1221; F16K 31/1225; F05D 2220/31
USPC .................................................. 251/62–63.6
See application file for complete search history.

(56) References Cited

U.S. PATENT DOCUMENTS

| 3,672,628 | A | * | 6/1972 | Aanstad | ............... F16K 31/1225 92/143 |
| 4,566,273 | A | * | 1/1986 | Baumeler | ............. F16K 31/122 60/407 |
| 4,589,444 | A | * | 5/1986 | Masek | ..................... F15B 15/18 91/437 |
| 7,650,908 | B2 | | 1/2010 | Seaton | |

(Continued)

FOREIGN PATENT DOCUMENTS

JP    S57-037157 A    3/1982
JP    H04-175586 A    6/1992

(Continued)

*Primary Examiner* — Hoang M Nguyen
(74) *Attorney, Agent, or Firm* — Foley & Lardner LLP

(57) ABSTRACT

The steam valve driving apparatus according to an embodiment is a steam valve driving apparatus regulating open and close position of a valve body. The steam valve driving apparatus includes: a plurality of hydraulic cylinders that presses the valve body in an opening direction. Each of the hydraulic cylinders includes: a piston rod extending outward from a piston in the opening direction; and an open-side cylinder chamber arranged in the opposite side of the piston with respect to the piston and to which hydraulic oil is supplied. The hydraulic cylinder is disposed on a side opposite to the valve body with respect to a closing spring pressing the valve body in a closing direction.

9 Claims, 8 Drawing Sheets

(56) References Cited

U.S. PATENT DOCUMENTS

| | | | |
|---|---|---|---|
| 9,650,910 | B2 | 5/2017 | Futahashi |
| 9,938,851 | B2 | 4/2018 | Okamura et al. |
| 9,982,558 | B2 * | 5/2018 | Katagake .............. F01D 17/145 |
| 10,224,863 | B2 | 3/2019 | Sakabe |
| 2015/0322812 | A1 * | 11/2015 | Futahashi ............... F01D 17/10 |
| | | | 60/660 |
| 2018/0216486 | A1 | 8/2018 | Futahashi |

FOREIGN PATENT DOCUMENTS

| | | | |
|---|---|---|---|
| JP | H06-81607 | A | 3/1994 |
| JP | H06-185305 | A | 7/1994 |
| JP | H09-032996 | A | 2/1997 |
| JP | 2002-097903 | A | 4/2002 |
| JP | 2007-278179 | A | 10/2007 |
| JP | 2009-002185 | A | 1/2009 |
| JP | 5140591 | B2 | 2/2013 |
| JP | 2015-017595 | A | 1/2015 |
| JP | 2015-048742 | A | 3/2015 |
| JP | 2016-098969 | A | 5/2016 |
| JP | 2017-073466 | A | 4/2017 |
| JP | 2017-082163 | A | 5/2017 |
| JP | 6332088 | B2 | 5/2018 |
| JP | 6352781 | B2 | 7/2018 |
| JP | 2019-031941 | A | 2/2019 |
| WO | WO-2014/098073 | A1 | 6/2014 |

* cited by examiner

STEAM VALVE DRIVING APPARATUS, STEAM VALVE APPARATUS, AND STEAM TURBINE PLANT

CROSS-REFERENCE TO RELATED APPLICATION

This application is based upon and claims the benefit of priority from the prior Japanese Patent Application No. 2019-091646, filed on May 14, 2019, the entire contents of which are incorporated herein by reference.

FIELD

Embodiments described herein generally relate to a steam valve driving apparatus, a steam valve apparatus, and a steam turbine plant.

BACKGROUND

The thermal efficiency of a steam turbine plant equipped with a steam turbine depends on the steam pressure and steam temperature at the steam turbine inlet and the exhaust pressure at the steam turbine outlet. The higher the steam pressure and steam temperature at the steam turbine inlet, the higher the thermal efficiency of the steam turbine plant. Moreover, the lower the exhaust pressure at the steam turbine outlet, the higher the thermal efficiency of the steam turbine plant.

In a steam turbine plant in recent years, there has been developed, for the purpose of improving thermal efficiency, a steam turbine having an ultra supercritical pressure in which a steam pressure at a steam turbine inlet is increased to a level higher than a conventional supercritical pressure. In this manner, discussions to achieve higher temperature and pressure of the steam turbine inlet are in progress.

The steam flow in such a steam turbine plant is controlled by a steam valve apparatus. The steam valve apparatus includes: a steam valve having a valve body; and a steam valve driving apparatus that performs open/close driving of the valve body of the steam valve by using high-pressure hydraulic oil. This hydraulic oil leaks to the outside from the steam valve driving apparatus in some cases. As described above, since the steam supplied to the steam turbine is at a high temperature and a high pressure, there is a possibility that the hydraulic oil leaking from the steam valve driving apparatus causes a fire.

This issue will be described with reference to FIG. 8. FIG. 8 illustrates a cross-sectional configuration of a steam valve apparatus 100 including an ordinary steam valve 101 and a steam valve driving apparatus 110.

First, the steam valve 101 that undergoes open/close driving performed by the steam valve driving apparatus 110 illustrated in FIG. 8 includes: a valve casing 102; a valve seat 103 provided within the valve casing 102; and a valve body 104 provided to be separable from the valve seat 103. The valve body 104 is integrally connected to a valve rod 105. The valve rod 105 is joined to a piston rod 133 of the steam valve driving apparatus 110, which will be described below, via a coupling 106.

The steam valve driving apparatus 110 illustrated in FIG. 8 includes: a closing spring 120 that presses the valve body 104 in a closing direction; and a hydraulic cylinder 130 that presses the valve body 104 in an opening direction. The closing spring 120 is disposed above the valve body 104 and the valve rod 105. The hydraulic cylinder 130 is disposed further above the closing spring 120. The hydraulic cylinder 130 includes: a cylinder main body 131; a piston 132 slidably provided in the cylinder main body 131; and a piston rod 133 extending downward from the piston 132 to the outside of the cylinder main body 131. A cylinder chamber 134 is provided below the piston 132 in the hydraulic cylinder 130, and high-pressure hydraulic oil is supplied to the cylinder chamber 134. The piston rod 133 is joined to the valve rod 105 via the coupling 106 described above.

When high-pressure hydraulic oil is supplied to the cylinder chamber 134 in the steam valve driving apparatus 110 illustrated in FIG. 8, the piston rod 133 rises by the pressure of the hydraulic oil, allowing the valve body 104 to separate from the valve seat 103. This operation opens the steam valve 101. In contrast, when the pressure of the hydraulic oil in the cylinder chamber 134 is decreased, the pressing force of the closing spring 120 lowers the piston rod 133, allowing the valve body 104 to come in contact with the valve seat 103. This operation closes the steam valve 101.

As illustrated in FIG. 8, a spring holder 121 is provided at an upper end of the coupling 106. The pressing force of the closing spring 120 acts on the coupling 105 via the spring holder 121. The pressing force of the closing spring 120 is directed in the closing direction (downward) of the valve body 104, and constantly acts on the coupling 106. The closing spring 120, the hydraulic cylinder 130, or the like, are supported by a stand 107 fixed to the valve casing 102 by bolts or the like. The valve rod 105, the piston rod 133, the closing spring 120, and the hydraulic cylinder 130 are arranged on one axis.

A bush 135 that allows penetration of the piston rod 133 is provided at the lower end of the hydraulic cylinder 130. Packing 136 prepared with a rubber material or the like is provided between the bush 135 and the piston rod 133. The packing 136 is provided to suppress the leakage of hydraulic oil from a gap between the bush 135 and the piston rod 133.

However, the pressure of the hydraulic oil supplied to the hydraulic cylinder 130 is, for example, high-pressure oil exceeding 10 MPa and might leak to the outside of the hydraulic cylinder 130 from the gap of the piston rod 133.

Meanwhile, the stand 107 includes a valve rod leak-off line 108 for suppressing the release of the leak steam leaking from the gap formed around the valve rod 105 to the outside (atmosphere side). The valve rod leak-off line 108 supplies the leak steam to other devices in the steam turbine plant. Part of the leak steam rises through a gap between the valve rod 105 and the stand 107 so as to be discharged from the stand 107 upward to the outside.

The released leak steam rises due to its high temperature, and constantly heats the piston rod 133, the closing spring 120, and the hydraulic cylinder 130 disposed above the stand 107.

The packing 136 is also constantly heated by the leak steam. For this reason, the packing 136 might be carbonized and deteriorate over time. Deterioration means decline of functions of the packing 136, leading to leakage of the hydraulic oil. Furthermore, the piston rod 133 moves up and down at open/close operation of the steam valve 101 and thus easily causes leakage of the hydraulic oil during this movement. Additionally, in a case where the packing 136 is worn and broken (or damaged) due to the up-down movement of the piston rod 133, the hydraulic oil might flow out in a jet or spray form in some cases.

The hydraulic oil that leaks in this manner would be exposed to the high-temperature leak steam described above. This can cause an occurrence of smoke or fire from the hydraulic oil. That is, it would be effective, in the event of a fire, to stop the leakage of hydraulic oil in order to extinguish the fire, and for this purpose, the steam turbine plant would be required to interrupt operation to stop the supply of hydraulic oil. Interruptions in operation of a steam turbine plant would be a problem in consideration of management of the plant. Furthermore, in view of the advancement of high temperature and high pressure in a steam turbine plant in the future, it is desired to further suppress the leakage of hydraulic oil.

DETAILED DESCRIPTION

A steam valve driving apparatus according to an embodiment is a steam valve driving apparatus regulating open and close position of a valve body. The steam valve driving apparatus includes: a plurality of hydraulic cylinders that presses the valve body in an opening direction. Each of the hydraulic cylinders includes: a piston rod extending outward from a piston in the opening direction; and an open-side cylinder chamber arranged in the opposite side of the piston with respect to the piston and to which hydraulic oil is supplied. The hydraulic cylinder is disposed on a side opposite to the valve body with respect to a closing spring pressing the valve body in a closing direction.

In addition, a steam valve apparatus according to an embodiment includes: a steam valve having a valve body; and the above-described steam valve driving apparatus that performs open/close driving of the valve body of the steam valve by using high-pressure hydraulic oil.

Furthermore, a steam turbine plant according to an embodiment includes: a boiler that generates steam; a steam turbine that obtains a rotational driving force with the steam generated by the boiler; a condenser that condenses steam discharged from the steam turbine; and the above-described steam valve apparatus that controls the flow of the steam generated by the boiler.

Hereinafter, a steam valve driving apparatus, a steam valve apparatus, and a steam turbine plant according to an embodiment of the present invention will be described with reference to the drawings.

The steam valve driving apparatus, the steam valve apparatus, and the steam turbine plant according to the present embodiment will be described with reference to FIGS. 1 to 7.

First, an example of a steam turbine plant to which the steam valve driving apparatus and the steam valve apparatus according to the present embodiment can be applied will be described with reference to FIG. 1.

Figure 1:
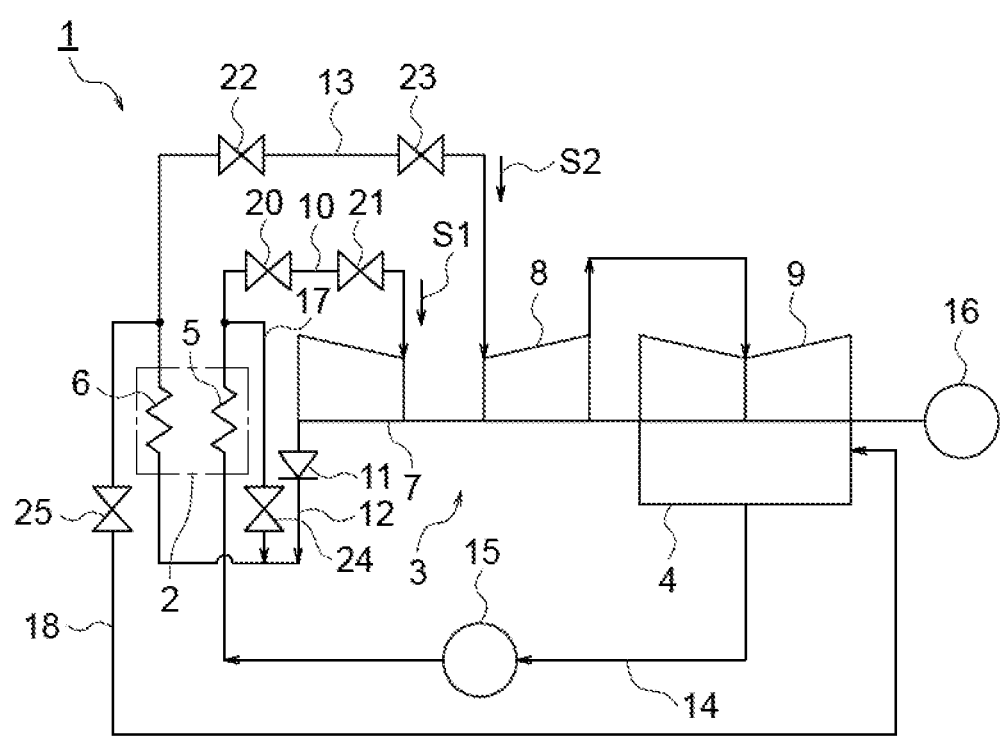
FIG. 1 is a system diagram illustrating an example of steam turbine plant according to the present embodiment.

As illustrated in FIG. 1, a steam turbine plant 1 includes: a boiler 2 that generates steam: a steam turbine 3 that obtains a rotational driving force with the steam generated by the boiler 2; and a condenser 4 that condenses the steam discharged from the steam turbine 3.

The boiler 2 includes: a steam generator 5 that heats a condensate supplied from the condenser 4 to generate steam; and a reheater 6 that reheats main steam S1 that has completed expansion work in a high-pressure turbine 7 described below. The boiler 2 burns the supplied fuel mixed with air to generate a combustion gas, in which the steam generator 5 generates steam with the heat of the generated combustion gas from condensate water, and the reheater 6 reheats the steam.

The steam turbine 3 includes the high-pressure turbine 7, an intermediate-pressure turbine 8, and a low-pressure turbine 9. A turbine rotor of the high-pressure turbine 7, a turbine rotor of the intermediate-pressure turbine 8, and a turbine rotor of the low-pressure turbine 9 (all not illustrated) are joined to each other.

The steam generated in the steam generator 5 is supplied to the high-pressure turbine 7 via a main steam line 10 as the main steam S1. The main steam line 10 includes: a main steam stop valve 20; and a steam control valve 21 provided downstream of the main steam stop valve 20. Among these, the main steam stop valve 20 is a valve provided mainly for stopping the flow of the main steam S1 in an emergency of the steam turbine 3, and the steam control valve 21 is provided mainly for controlling (adjusting) the flow rate of the main steam S1 supplied to the high-pressure turbine 7. The high-pressure turbine 7 performs rotational driving using the main steam S1 supplied from the steam generator 5. That is, the main steam S1 supplied to the high-pressure turbine 7 performs expansion work, which gives a rotational driving force to the high-pressure turbine 7. After the expansion work, the main steam S1 is supplied to the reheater 6 through a low-temperature reheat line 12 having a check valve 11.

The steam reheated in the reheater 6 is supplied to the intermediate-pressure turbine 8 via a reheat steam line 13 as reheat steam S2. The reheat steam line 13 includes a reheat steam stop valve 22 and an intercept valve 23 (reheat steam control valve) provided downstream of the reheat steam stop valve 22. Among these, the reheat steam stop valve 22 is a valve provided mainly for stopping the flow of the reheat steam S2 in the emergency of the steam turbine 3, and the intercept valve 23 is provided mainly for adjusting (controlling) the flow rate of the reheat steam S2 supplied to the intermediate-pressure turbine 8. That is, the reheat steam S2 supplied to the intermediate-pressure turbine 8 performs expansion work, which gives a rotational driving force to the intermediate-pressure turbine 8. The reheat steam S2 that has completed the expansion work is supplied to the low-pressure turbine 9 to further perform expansion work, and thereafter, is supplied to the condenser 4 as turbine exhaust.

The turbine exhaust supplied to the condenser 4 is condensed to be a condensate. The condenser 4 and the steam generator 5 of the boiler 2 are joined by a water supply line 14, and the water supply line 14 includes a water supply pump 15. This allows the condensate in the condenser 4 to be pressurized by the water supply pump 15 and supplied to the steam generator 5 of the boiler 2.

The steam turbine plant 1 further includes a generator 16 that generates power by the rotational driving force of the steam turbine 3. As described above, with acquisition of the rotational driving force of the high-pressure turbine 7, the intermediate-pressure turbine 8, and the low-pressure turbine 9, the generator 16 is driven to generate power.

A high-pressure turbine bypass line 17 branches from a portion of the main steam line 10 on the upstream side of the main steam stop valve 20. The high-pressure turbine bypass line 17 has a high-pressure turbine bypass valve 24 and joins the low-temperature reheat line 12. In this manner, the main steam S1 can be supplied to the low-temperature reheat line 12 without being supplied to the high-pressure turbine 7. For example, in a case where the pressure or temperature of the main steam S1 does not reach a predetermined value at the time of starting the turbine, or in a case where the flow rate of the main steam S1 becomes excessive at the time of load shut-off, the high-pressure turbine bypass valve 24 is opened so as to supply the surplus main steam S1 to the low-temperature reheat line 12 as exemplary operation.

A low-pressure turbine bypass line 18 branches from a portion of the reheat steam line 13 upstream of the reheat steam stop valve 22. The low-pressure turbine bypass line 18 has a low-pressure turbine bypass valve 25 and is joined to the condenser 4. In this manner, the reheat steam S2 can be supplied to the condenser 4 without being supplied to the intermediate-pressure turbine 8 or the low-pressure turbine 9. For example, similarly to the case of the high-pressure turbine bypass valve 24, in a case where the pressure or temperature of the reheat steam S2 does not reach a predetermined value at the time of starting the turbine, or in a case where the flow rate of the reheat steam S2 becomes excessive at the time of load shut-off, the low-pressure turbine bypass valve 25 is opened so as to supply the surplus reheat steam S2 to the condenser 4 as exemplary operation.

With the presence of the high-pressure turbine bypass line 17 and the low-pressure turbine bypass line 18 in this manner, it is possible to implement circulating operation of the boiler 2 alone without supplying steam to the steam turbine 3.

Figure 2:
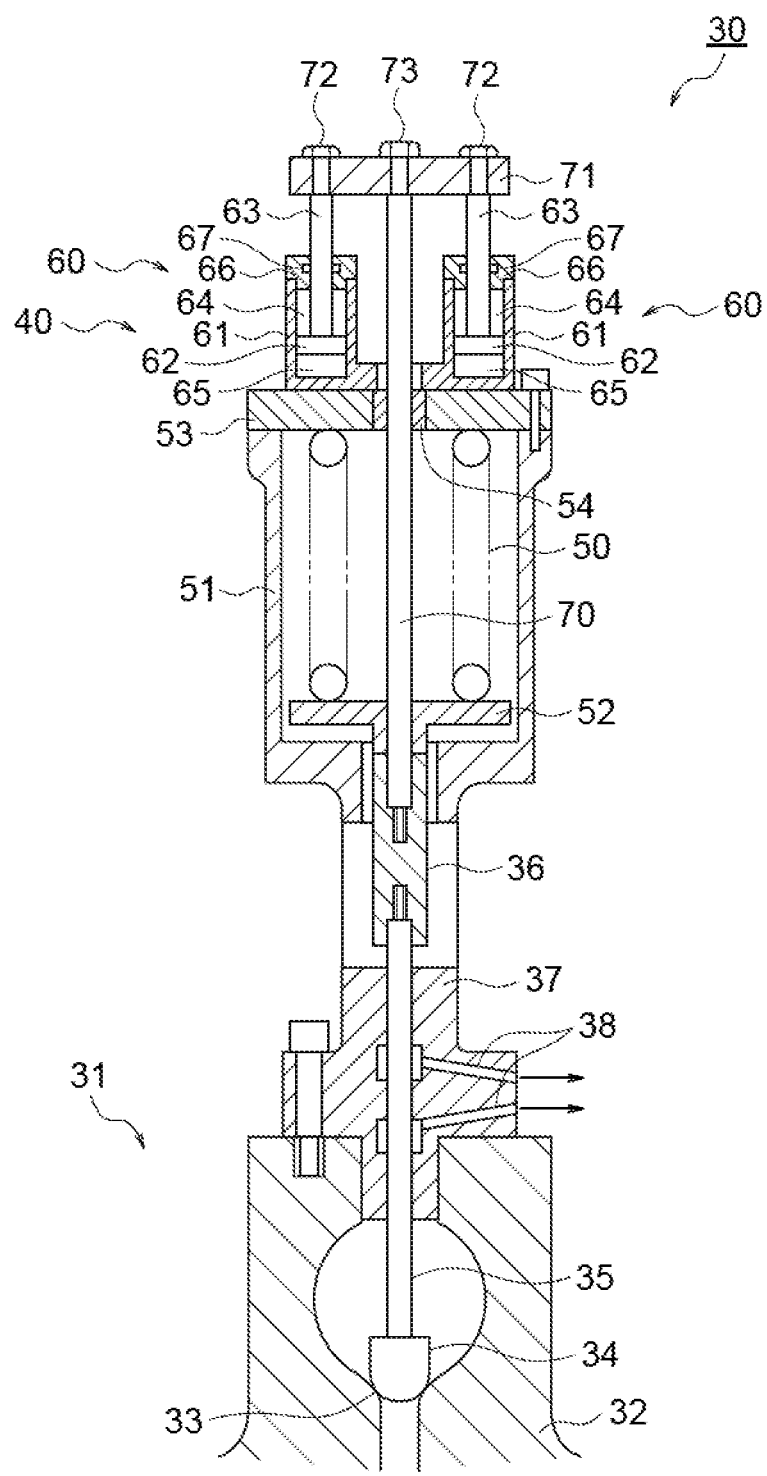
FIG. 2 is a cross-sectional view illustrating a closed state of the steam valve apparatus according to the present embodiment.

In this manner, in the steam turbine plant 1 has flows of steam generated in the boiler 2 toward various devices. The steam flow in such a steam turbine plant 1 is controlled by the steam valve apparatus 30. As illustrated in FIG. 2, the steam valve apparatus 30 includes: a steam valve 31 including a valve body 34; and a steam valve driving apparatus 40 that performs open/close driving of the valve body 34 of the steam valve 31 using high-pressure hydraulic oil.

Next, the steam valve 31 according to the present embodiment will be described with reference to FIG. 2. Examples of the steam valve 31 according to the present embodiment include the main steam stop valve 20, the steam control valve 21, the reheat steam stop valve 22, the intercept valve 23, the high-pressure turbine bypass valve 24, and the low-pressure turbine bypass valve 25 in the above-described steam turbine plant 1.

As illustrated in FIG. 2, the steam valve 31 according to the present embodiment includes: a valve casing 32; a valve seat 33 provided in the valve casing 32; and a valve body 34 provided to be separable from the valve seat 33. The valve body 34 is integrally connected to a valve rod 35. The valve rod 35 is joined to a steam valve driving apparatus 40 via a coupling 36. The steam valve driving apparatus 40 allows the valve body 34 to reciprocate with respect to the valve seat 33. The valve body 34 is separated from the valve seat 33 when the steam valve 31 is in an open state, while the valve body 34 comes in contact with the valve seat 33 when the steam valve 31 is in a closed state.

A stand 37 is attached to an upper portion of the valve casing 32. Above the stand 37, a steam valve driving apparatus 40 is disposed. The steam valve driving apparatus 40 is attached to the stand 37. The valve rod 35 penetrates the stand 37. The stand 37 is provided with a valve rod leak-off line 38, which communicates with a gap between the valve rod 35 and the stand 37. The valve rod leak-off line 38 is connected to a valve rod leak-off system (not illustrated). With this configuration, the leak steam from the inside of the valve casing 32 through the gap is collected to suppress the release of the leak steam to the outside.

Next, the steam valve driving apparatus 40 according to the present embodiment will be described with reference to FIGS. 2 to 5. The steam valve driving apparatus 40 illustrated here is a hydraulic driving apparatus (hydraulic actuator) for performing open/close driving of the valve body 34 of the steam valve 31 using high-pressure hydraulic oil. The steam valve driving apparatus 40 according to the present embodiment has a configuration in which the valve rod 35 is pulled out to the atmosphere side to allow the valve body 34 to be retracted from the valve seat 33 so as to open the steam valve 31. The configuration of the steam valve driving apparatus 40 will be described on the basis of, for convenience, a vertical relationship in which the steam valve driving apparatus 40 is disposed above the steam valve 31. However, the arrangement relationship between the steam valve 31 and the steam valve driving apparatus 40 is not limited to this, and can have any relationship. For example, the steam valve driving apparatus 40 may be arranged below the steam valve 31 in some cases.

As illustrated in FIG. 2, the steam valve driving apparatus 40 according to the present embodiment includes: a closing spring 50 that presses the valve body 34 of the steam valve 31 in the closing direction; a plurality of hydraulic cylinders 60 that each presses the valve body 34 of the steam valve 31 in the opening direction; and a joint rod 70 that joins a piston rod 63 (described below) of each of the hydraulic cylinders 60 to the valve body 34. In the present embodiment, the steam valve driving apparatus 40 including one closing spring 50, two hydraulic cylinders 60, and one joint rod 70 will be described as an example.

The closing spring 50 is housed in a cylindrical spring box 51. The spring box 51 includes a spring holder 52 slidably provided. The spring holder 52 is attached to the coupling 36. A spring lid 53 is fixed to an upper end of the spring box 51. The closing spring 50 is interposed between the spring holder 52 and the spring lid 53. The pressing force (spring force) of the closing spring 50 in the closing direction (toward the valve body 34, downward) is constantly transmitted to the valve rod 35 via the spring holder 52 and the coupling 36. A bush 54 penetrates through the spring lid 53. A joint rod 70 penetrates through the bush 54, with the joint rod 70 supported by the bush 54.

The hydraulic cylinder 60 includes: a cylinder main body 61; a piston 62 slidably provided in the cylinder main body 61; a piston rod 63 extending upward from the piston 62 (to the side opposite to the valve body 34) to the outside of the cylinder main body 61; a rod-side cylinder chamber 64; and an open-side cylinder chamber 65. The hydraulic cylinder 60 may be referred to as an oil cylinder.

Figure 3:
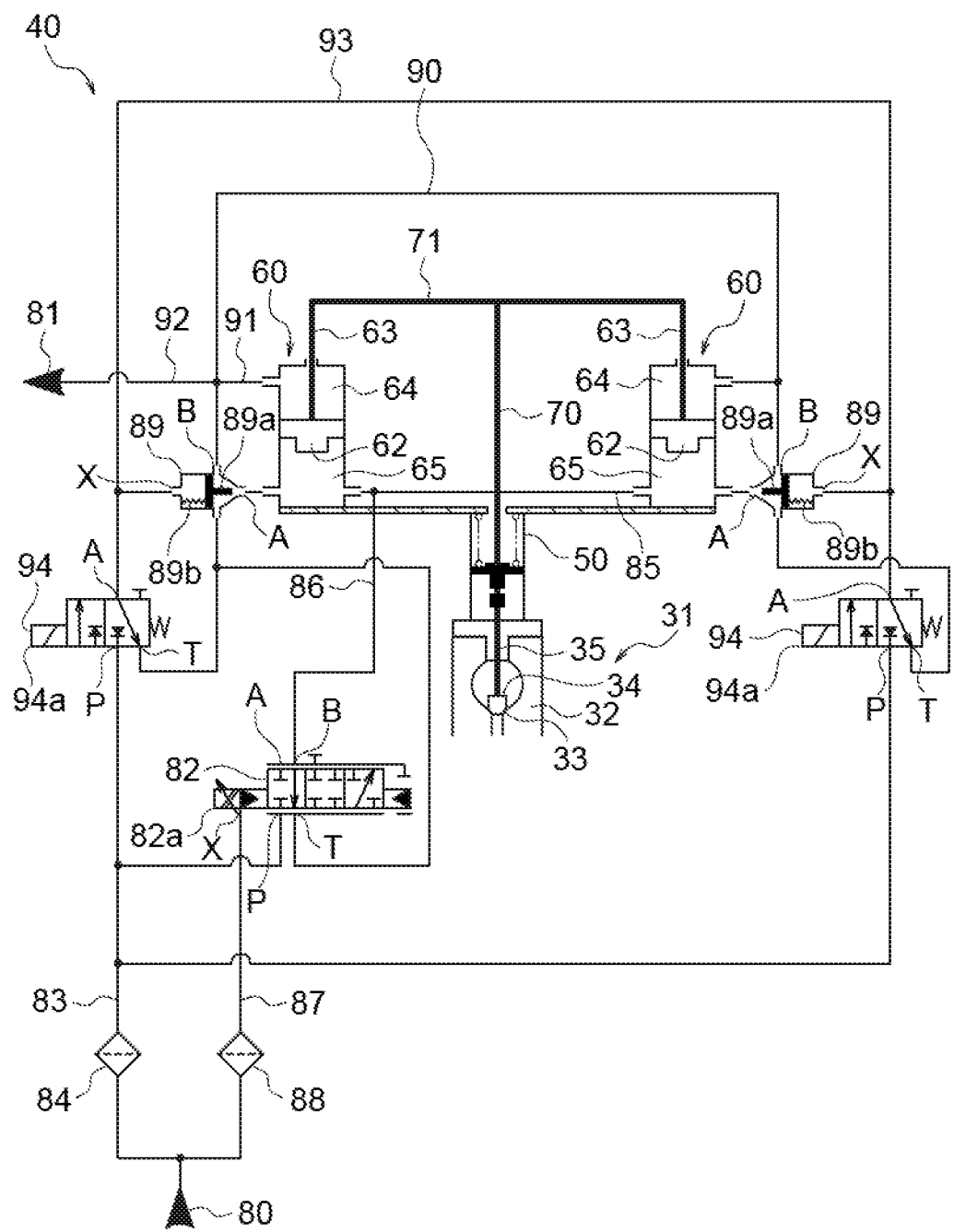
FIG. 3 is a hydraulic system diagram of the steam valve apparatus in FIG. 2.

The rod-side cylinder chamber 64 is provided above the piston 62 (on the side of the piston rod 63). The piston rod 63 is disposed in the rod-side cylinder chamber 64, with the piston rod 63 penetrating through the rod-side cylinder chamber 64. A bush 66 is provided at the upper end of the cylinder main body 61. The piston rod 63 penetrates through the bush 66 and extends to the outside (atmosphere side). As illustrated in FIG. 3, a portion of the hydraulic oil discharged from the open-side cylinder chamber 65 is supplied to the rod-side cylinder chamber 64. The hydraulic oil supplied to the rod-side cylinder chamber 64 is pressureless, that is, has no pressure for moving the piston. However, as illustrated in FIG. 2, a packing 67 formed of a rubber material or the like is provided between the piston rod 63 and the bush 66 in order to suppress the leakage of the hydraulic oil. This packing 67 is arranged at the upper end of the cylinder main body 61. Accordingly, the packing 67 is arranged at a position far from the stand 37 from which the leak steam is released.

The open-side cylinder chamber 65 is disposed below the piston 62 (on the side opposite to the piston rod 63). The open-side cylinder chamber 65 is defined by a piston 62 so as to be configured as a sealed space containing no components or structures extending outside the cylinder main body 61. As illustrated in FIG. 3, high-pressure hydraulic oil is supplied to the open-side cylinder chamber 65 when opening the steam valve 31.

As illustrated in FIG. 2, the joint rod 70 extends downward (toward the valve body 34) from a joint plate 71 described below. The joint rod 70 is joined to the valve rod 35 via the coupling 36. The joint rod 70, the valve rod 35 and the closing spring 50 are arranged on one axis. The coupling 36 is disposed above the valve rod 35, and the joint rod 70 is disposed above the coupling 36.

The above-described spring holder 52 is disposed above the coupling 36. The closing spring 50 and the spring lid 53 are disposed above the spring holder 52. The joint rod 70 penetrates through the bush 54 of the spring lid 53, the closing spring 50, and the spring holder 52. The hydraulic cylinder 60 is disposed above the spring lid 53. That is, the hydraulic cylinder 60 is disposed above the closing spring 50 (on the side opposite to the valve body 34). The lower end of each of the hydraulic cylinders 60 is attached to the spring lid 53.

Figure 4:
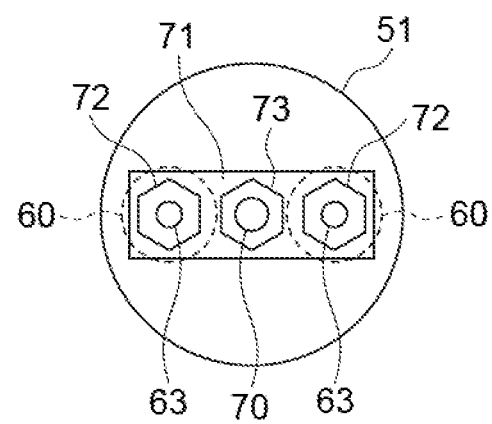
FIG. 4 is a schematic plan view illustrating the steam valve apparatus of FIG. 2.
Figure 8:
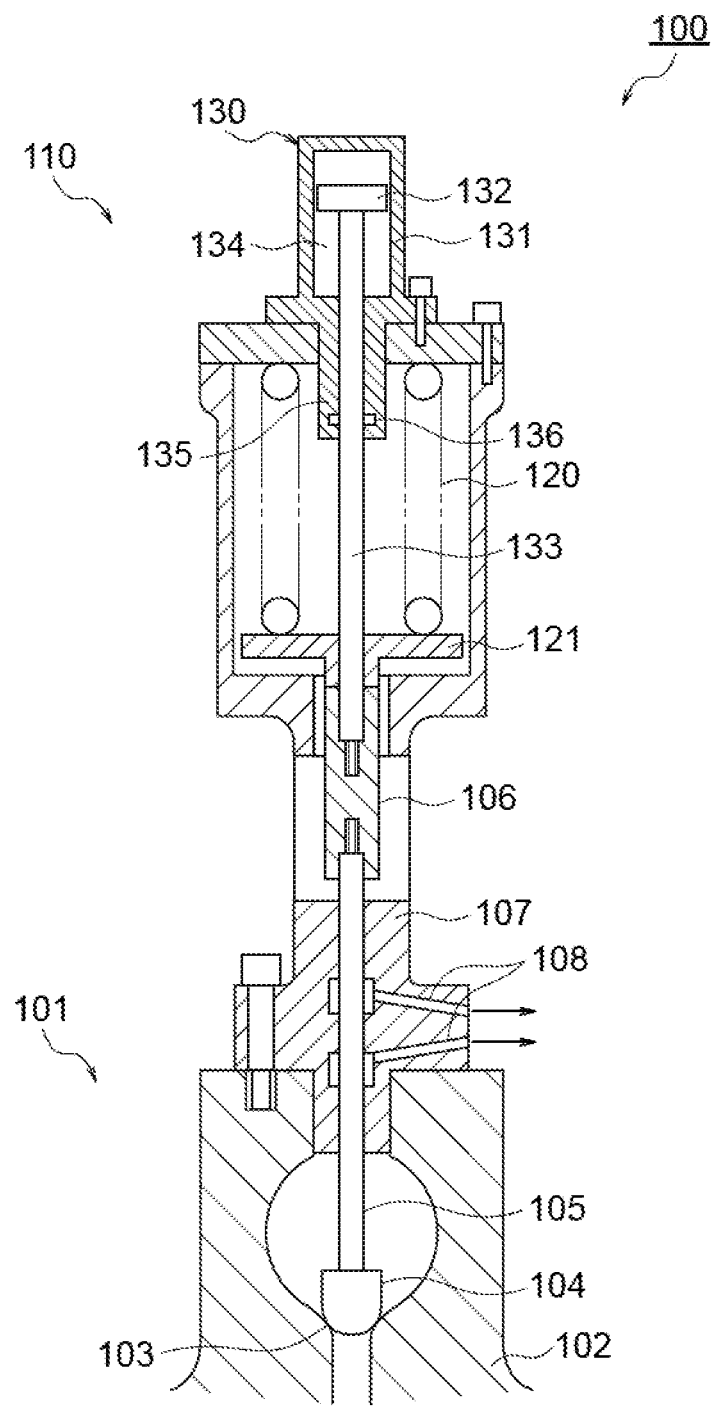
FIG. 8 is a cross-sectional view illustrating a closed state of an ordinary steam valve apparatus.

As illustrated in FIG. 4, the plurality of hydraulic cylinders 60 is arranged around the joint rod 70 when viewed in an axial direction of the joint rod 70 (up-down direction in FIG. 2). For example, the plurality of hydraulic cylinders 60 may be arranged symmetrically (line-symmetrically, point-symmetrically, or the like) with respect to the joint rod 70. Furthermore, the plurality of hydraulic cylinders 60 may be arranged evenly in the circumferential direction around the joint rod 70, In FIGS. 2 and 4, two hydraulic cylinders 60 are arranged around the joint rod 70 as an example. In this case, the two hydraulic cylinders 60 are arranged at positions at an angle of 180° in the circumferential direction of the joint rod 70 when viewed in the axial direction of the joint rod 70 as illustrated in FIG. 4, That is, the two hydraulic cylinders 60 may be arranged symmetrically with respect to the joint rod 70 (the left-right symmetry in FIG. 4), and may be evenly arranged in the circumferential direction. Each of the hydraulic cylinders 60 does not protrude outside the spring box 51. Therefore, downsizing of the hydraulic cylinder 60 according to the present embodiment is achieved compared with the hydraulic cylinder 130 in an ordinary steam valve driving apparatus as illustrated in FIG. 8. The cylinder diameter of each of the hydraulic cylinders 60 (the inner diameter of the open-side cylinder chamber 65) is the same.

As illustrated in FIG. 2, the piston rod 63 and the joint rod 70 of each of the hydraulic cylinders 60 are joined by the joint plate 71 (joint member). The joint plate 71 is disposed above the piston rod 63 (on the side opposite to the valve body 34). More specifically, a male screw portion (not illustrated) is provided at the upper end of the piston rod 63, and at least a portion of the male screw portion extends above the joint plate 71 so as to be screwed to a nut 72. In this manner, the piston rod 63 and the joint plate 71 are fastened by the nut 72. Similarly, a male screw portion is also provided at the upper end portion of the joint rod 70, and at least a portion of the male screw portion extends above the joint plate 71 so as to be screwed to a nut 73.

With such a configuration, when high-pressure hydraulic oil is supplied to the open-side cylinder chamber 65 of the hydraulic cylinder 60, the piston 62 and the piston rod 63 that have received the pressure of the hydraulic oil overcome the pressing force of the closing spring 50 and move upward. This allows the valve rod 35 to be pulled out to the atmosphere side so as to drive the valve body 34 upward (in the opening direction). This allows the valve body 34 to be retracted and separated from the valve seat 33 so as to open the steam valve 31. When the steam valve 31 is closed, the hydraulic oil is discharged from the open-side cylinder chamber 65, and then, the piston 62 moves downward by the pressing force of the closing spring 50. This makes it possible to drive the valve body 34 downward (in the closing direction). This allows the valve body 34 to be move forward to the valve seat 33 so as to close the steam valve 31.

Next, a hydraulic oil supply-discharge mechanism regarding the hydraulic cylinder 60 in the steam valve driving apparatus 40 according to the present embodiment will be described. As illustrated in FIG. 3, the steam valve driving apparatus 40 further includes: a supply port 80 that supplies hydraulic oil: a discharge port 81 that discharges hydraulic oil; and a servo valve 82 (supply control valve) that permits or blocks supply of hydraulic oil to the open-side cylinder chamber 65 of each of the hydraulic cylinders 60.

The supply port 80 is connected to a hydraulic oil supply system (not illustrated), and high-pressure hydraulic oil is supplied to the supply port 80 from the hydraulic oil supply system. The discharge port 81 is connected to a drain system (not illustrated), and the hydraulic oil discharged from the discharge port 81 is discharged to this drain system.

The servo valve 82 is switchable between a state of permitting supply of hydraulic oil from the supply port 80 to the two open-side cylinder chambers 65 and a state of blocking the supply of the hydraulic oil. More specifically, a P-port of the servo valve 82 communicates to the supply port 80 via a first supply port-side line 83. The first supply port-side line 83 includes a first oil filter 84 for removing foreign matter from the hydraulic oil. A B-port of the servo valve 82 communicates with each of the open-side cylinder chambers 65 of the two hydraulic cylinders 60, with a T-port communicating with the discharge port 81 via a B-port of a cartridge valve 89 described below.

The open-side cylinder chambers 55 of each of the hydraulic cylinders 60 communicates with each other by a supply-side communication line 85. The B-port of the servo valve 82 and the supply-side communication line 85 communicate with each other by a supply line 86. This configuration allows the hydraulic oil to be supplied from the B-port to the supply-side communication line 85 via the supply line 86, allowing the hydraulic oil to be split in the supply-side communication line 85. In this manner, the pressure of the hydraulic oil supplied to each of the open-side cylinder chambers 65 is equalized.

The servo valve 82 includes a coil 82a that receives an electrical signal transmitted from a control device (not illustrated). Furthermore, hydraulic oil as pilot oil is constantly supplied from the supply port 80 to the X-port for a spool valve of the servo valve 82 via a second supply port-side line 87. The second supply port-side line 87 branches off from the upstream portion of the first oil filter 84 in the first supply port-side line 83, and the second supply port-side line 87 includes a second oil filter 88 for removing foreign matter from the hydraulic oil. The present embodiment illustrates an example in which the servo valve 82 has a position control function of controlling the position of the spool valve in accordance with the magnitude of an electrical signal input to the coil 82a.

Figure 7:
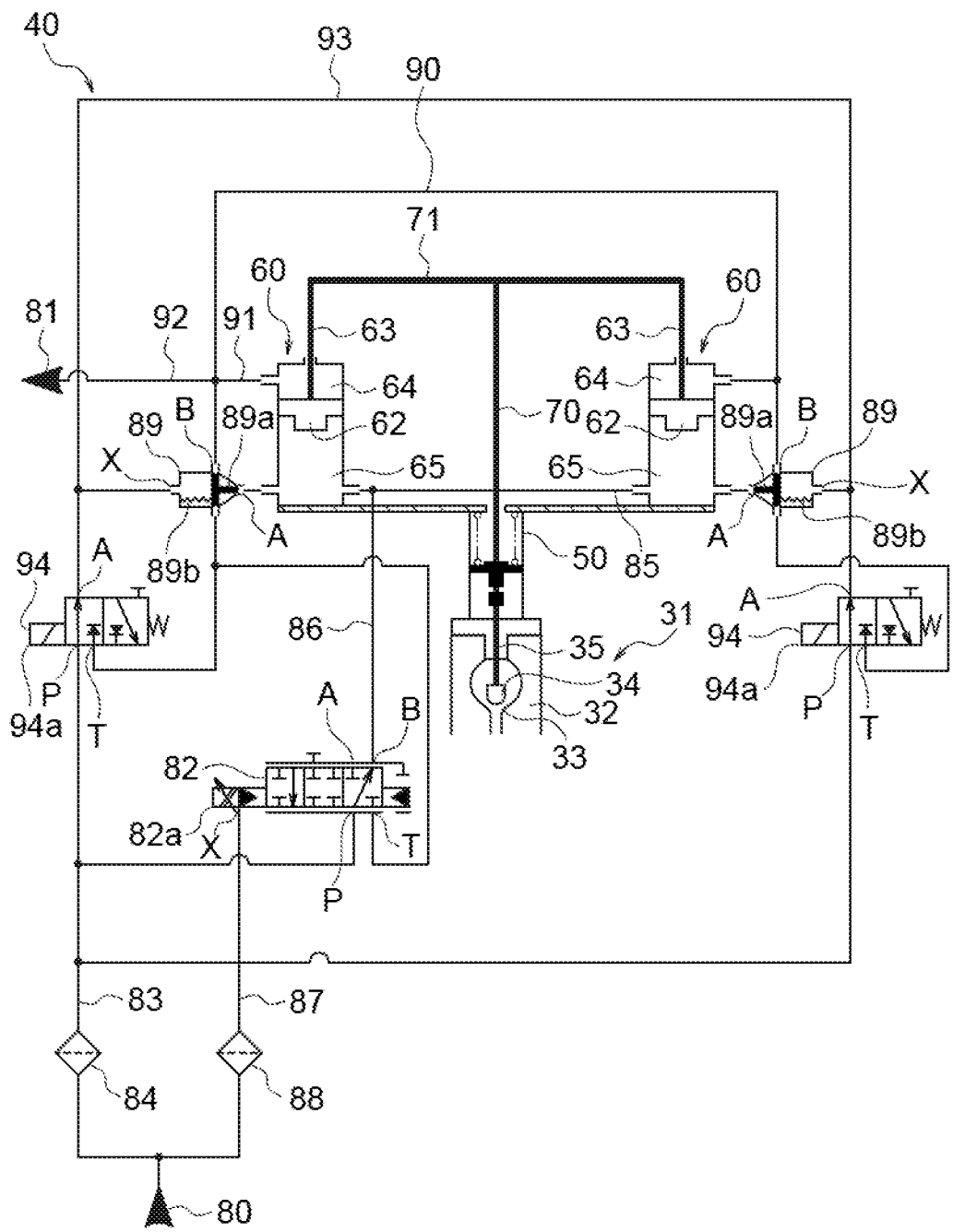
FIG. 7 is a hydraulic system diagram of the steam valve apparatus in FIG. 6.

For example, when an opening direction electrical signal is input to the coil 82a of the servo valve 82, the spool valve moves as illustrated in FIG. 7, allowing the P-port and the B-port of the servo valve 82 to communicate with each other. This permits the supply of hydraulic oil from the supply port 80 to each of the open-side cylinder chambers 65, so as to allow the hydraulic oil to be supplied from the supply port 80 to each of the open-side cylinder chambers 65. In contrast, when a closing direction electrical signal is input to the coil 82a, the spool valve moves as illustrated in FIG. 3. In this case, the P-port and the B-port of the servo valve 82 are shut off, and this blocks the supply of hydraulic oil from the supply port 80 to each of the open-side cylinder chambers 65. This, on the other hand, allows communication between the B-port and the T-port.

The cartridge valve 89 (discharge control valve) individually communicates with the open-side cylinder chamber 65 of each of the hydraulic cylinders 50. The cartridge valve 89 is configured to block or permit the discharge of the hydraulic oil from the open-side cylinder chamber 65 of the corresponding hydraulic cylinder 60. That is, the cartridge valve 89 is switchable between a state of blocking discharge of hydraulic oil from the corresponding open-side cylinder chamber 65 and a state of permitting the discharge of hydraulic oil. More specifically, the A-port of the cartridge valve 89 communicates with the corresponding open-side cylinder chamber 65. The X-port of the cartridge valve 89 communicates to the A-port of a corresponding fast-acting solenoid valve 94 (described below), while the B-port of the cartridge valve 89 communicates to the discharge port 81.

The cartridge valve 89 includes a valve body 89a and a reset spring 89b that presses the valve body 89a in a direction of shutting off the A-port and the B-port (rightward in FIG. 3). In a case where the valve body 89a is not receiving pressure from the hydraulic oil supplied to the A-port or the X-port, the pressing force of the reset spring 89b shuts off the A-port and the B-port.

Each of the cartridge valves 89 communicates with each other via a discharge-side communication line 90. More specifically, the discharge-side communication line 90 communicates with the port B of the cartridge, valve 89 that discharges the hydraulic oil in the cartridge valve 89. This equalizes the pressure of the hydraulic oil in the B-port of each of the cartridge valves 89.

Two rod-side lines 91 communicate with each of the discharge-side communication lines 90. Each of the rod-side lines 91 communicates with the rod-side cylinder chamber 64 of the corresponding hydraulic cylinder 60. This allows a portion of the hydraulic oil discharged to the discharge-side communication line 90 to be supplied to the rod-side cylinder chamber 64.

Furthermore, a discharge port-side line 92 communicating with the discharge port 81 communicates with the discharge-side communication line 90. With this configuration, the hydraulic oil discharged from the cartridge valve 89 to the discharge-side communication line 90 is to be discharged to the discharge port 81.

Each of the cartridge valves 89 communicates with each other via a solenoid valve-side communication line 93. More specifically, the solenoid valve-side communication line 93 communicates with an X-port, which is a pilot port communicating with the fast-acting solenoid valve 94 described below, among the ports of the cartridge valve 89. This equalizes the pressure of the hydraulic oil in the X-port of each of the cartridge valves 89.

Each of the cartridge valves 89 is controlled by the fast-acting solenoid valve 94. That is, the X-port is pressurized by hydraulic oil in a state where the hydraulic oil is supplied from an A-port of each of the fast-acting solenoid valves 94 to the X-port of the cartridge valve 89. Therefore, the cartridge valve 89 is closed, and the A-port and the B-port of the cartridge valve 89 are shut off. This blocks the discharge of the hydraulic oil from the corresponding open-side cylinder chamber 65 to the discharge port 81. In contrast, the cartridge valve 89 is opened, and the A-port and the B-port of the cartridge valve 89 communicate with each other when the hydraulic oil is discharged from the X-port of the cartridge valve 89. This permits the flow of the hydraulic oil from the open-side cylinder chamber 65 to the discharge port 81, so as to allow the hydraulic oil to be discharged from the open-side cylinder chamber 65 to the discharge-side communication line 90.

Each of the fast-acting solenoid valves 94 is configured to permit the supply of hydraulic oil to the cartridge valve 89 or to permit the discharge of hydraulic oil from the cartridge valve 89. That is, each of the fast-acting solenoid valves 94 is switchable between a state of permitting the supply of hydraulic oil to the cartridge valve 89 and a state of permitting the discharge of hydraulic oil from the cartridge valve 89. With the control of the cartridge valve 89 by the fast-acting solenoid valve 94 in this manner, the cartridge valve 89 blocks or permits the discharge of the hydraulic oil from the open-side cylinder chamber 65 of the hydraulic cylinder 60. More specifically, the P-port of the fast-acting solenoid valve 94 communicates with the supply port 80 via the first supply port-side line 83 described above. The A-port of the fast-acting solenoid valve 94 communicates with the X-port of the cartridge valve 89, while the T port of the fast-acting solenoid valve 94 communicates to the discharge port 81 via the B-port of the cartridge valve 89.

The fast-acting solenoid valve 94 includes a coil 94a that is excited when it receives an electrical signal transmitted from a control device (not illustrated). An input of an electrical signal to the coil 94a excites the coil 94a, allowing the P-port and the A-port of the fast-acting solenoid valve 94 to communicate with each other, so as to permit the supply of hydraulic oil from the supply port 80 to the X port of the cartridge valve 89, as illustrated in FIG. 7. This allows the hydraulic oil to be supplied from the supply port 80 to the X-port of the cartridge valve 89. In contrast, the excitation of the coil 94a is released in a state where no electrical signal is input to the coil 94a. This allows the A-port and the T port of the fast-acting solenoid valve 94 to communicate with each other as illustrated in FIG. 3, so as to permit the discharge of hydraulic oil from the X-port of the cartridge valve 89 to the discharge port 81. With this configuration, the hydraulic oil is discharged from the X-port of the cartridge valve 89 to the discharge port 81 via the A-port and the T port of the fast-acting solenoid valve 94 and via the B-port of the cartridge valve 89.

Figure 5:
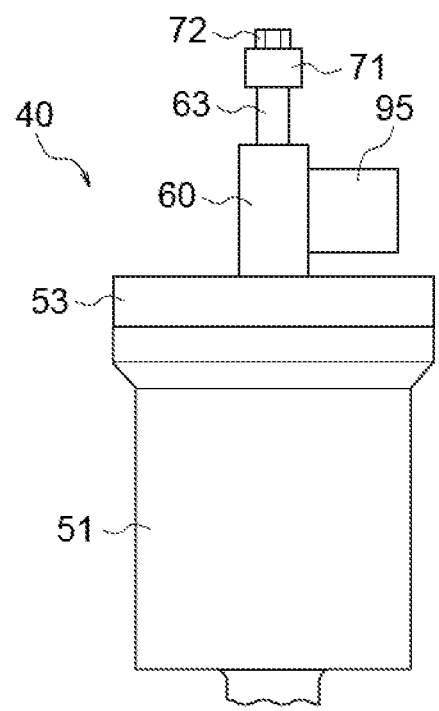
FIG. 5 is a schematic external view of the steam valve apparatus of FIG. 2.

As illustrated in FIG. 5, the steam valve driving apparatus 40 according to the present embodiment further includes a manifold block 95. The manifold block 95 includes the above-described supply port 80, the discharge port 81, and various lines. The various lines are formed in the manifold block 95. Although not illustrated in FIG. 5, the various valves 82, 89, 94, filters 84, 88, or the like are attached to an outer surface of the manifold block 95. Although the manifold block 95 may be attached to the side surfaces of the two hydraulic cylinders 60, the manifold block 95 need not be attached to one hydraulic cylinder 60 as long as the manifold block 95 is attached to the side surface of the other hydraulic cylinders 60.

Figure 6:
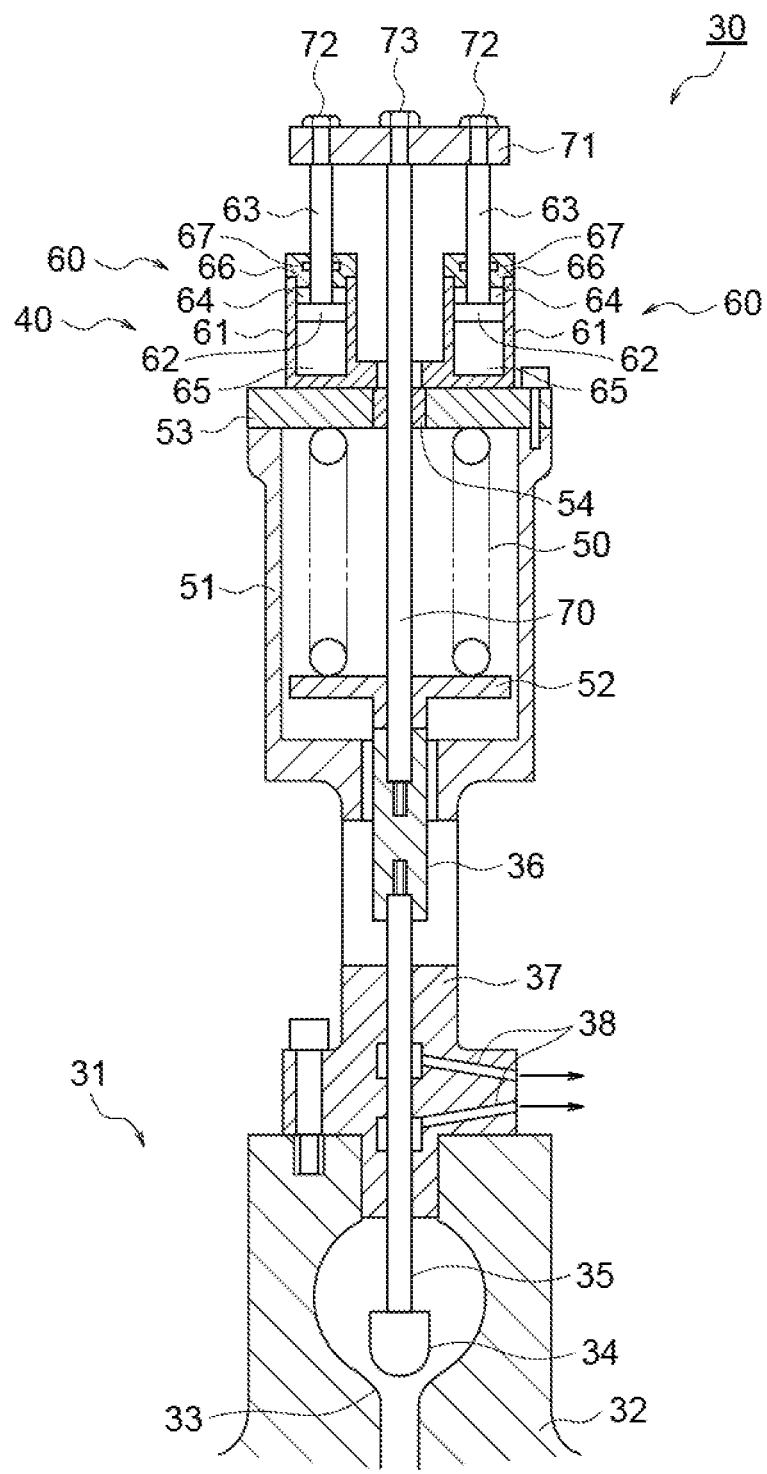
FIG. 6 is a cross-sectional view illustrating an open state of the steam valve apparatus of FIG. 2.

Next, the operation of the present embodiment having such a configuration, here, a method of operating the steam valve will be described. FIG. 2 illustrates a cross-sectional view of the steam valve apparatus 30 in a closed state, FIG. 3 illustrates a system diagram of the steam valve apparatus 30 in a closed state, FIG. 6 illustrates a cross-sectional view of the steam valve apparatus 30 in an open state, and FIG. 7 illustrates a system diagram of the steam valve apparatus 30 in an open state.

First, in any of the open state and the closed state of the steam valve 31, the high-pressure hydraulic oil supplied from the supply port 80 passes through the first supply port-side line 83 to be constantly supplied to the P-port of each of the fast-acting solenoid valves 94 via the first supply port-side line 83. Moreover, a portion of the high-pressure hydraulic oil that has passed through the first supply port-side line 83 is also constantly supplied to the P-port of the servo valve 82. High-pressure hydraulic oil is also supplied to the second supply port-side line 87 branched from the upstream portion of the first oil filter 84 in the first supply port-side line 83, leading to constant supply of the hydraulic oil to the X-port for a spool valve on the servo valve 82.

In the case of opening (resetting) the steam valve 31, each of the fast-acting solenoid valves 94 is excited. This allows the P-port and the A-port of the fast-acting solenoid valve 94 to communicate with each other, and the hydraulic oil is supplied as pilot oil from the supply port 80 to the X-port of each of the cartridge valves 89 via the fast-acting solenoid valve 94, as illustrated in FIG. 7. This pressurizes the X-port of each of the cartridge valves 89 to shut of the A-port and the B-port of each of the cartridge valves 89, and thereby closes the cartridge valve 89. This blocks the discharge of the hydraulic oil from the open-side cylinder chamber 65 of each of the hydraulic cylinder 60 to the discharge port 81. Since the X-port of each of the cartridge valves 89 communicates with the solenoid valve-side communication line 93, the generation of a pressure difference between the X-ports of the two cartridge valves 89 is suppressed. This makes it possible to synchronize the movement of the valve body 89a of each of the cartridge valves 89.

Furthermore, in the case of opening the steam valve 31, an electrical signal in the opening direction is input to the servo valve 82. Then, as illustrated in FIG. 7, the P-port and the B-port of the servo valve 82 communicate with each other, and high-pressure hydraulic oil is supplied from the supply port 80 to the B-port via the P-port of the servo valve 82. The high-pressure hydraulic oil is diverted in the supply-side communication line 85 and supplied to the open-side cylinder chambers 65 of the respective hydraulic cylinders 60. The open-side cylinder chamber 65 to which the high-pressure hydraulic oil is supplied is configured as a sealed space containing no components or structures extending outside the cylinder main body 61 as described above. This configuration suppresses the leakage of the hydraulic oil in the open-side cylinder chamber 65 to the outside.

When the hydraulic oil is supplied to each of the open-side cylinder chambers 65, the hydraulic oil is also supplied to the corresponding A-port of the cartridge valve 89. As described above, since the A-port and the B-port of each of the cartridge valves 89 are shut off, the discharge of the hydraulic oil from the open-side cylinder chamber 65 to the discharge port 81 is blocked. This increases the pressure of the hydraulic oil in the open-side cylinder chamber 65. In each of the cartridge valves 89, while high-pressure hydraulic oil is supplied to the X-port, high-pressure hydraulic oil is also supplied to the A-port. With this configuration, the valve body 89a of the cartridge valve 89 receives pressure from each of the hydraulic oil supplied to the X-port and the hydraulic oil supplied to the A-port. This prevents the movement of the valve body 89a of the cartridge valve 89, making it possible to stably maintain the state in which the A-port and the B-port are shut off.

When the pressure of the hydraulic oil in the open-side cylinder chamber 65 increased, each of the pistons 62 is pressed by the pressure of the hydraulic oil in the open-side cylinder chamber 65. Consequently, the piston 62 overcomes the spring force of the closing spring 50 and moves upward (in the opening direction). In this manner, the piston rods 63 of the two hydraulic cylinders 60 can be simultaneously moved in the opening direction by one servo valve 82. Furthermore, as described above, the open-side cylinder chambers 65 of the two hydraulic cylinders 60 communicate with each other by the supply-side communication line 85, and thus, occurrence of a pressure difference between the two open-side cylinder chambers 65 is suppressed. Therefore, the two piston rods 63 can be synchronized in their movements and moved simultaneously.

The driving force (or thrust) that the piston 62 and the piston rod 63 receive from the hydraulic oil is transmitted to the valve rod 35 via the joint plate 71, the joint rod 70, and the coupling 36. In this manner, as illustrated in FIG. 6, the valve body 34 can be moved upward to open the steam valve 31.

In contrast, in a case where the steam valve 31 is suddenly closed (tripped), each of the fast-acting solenoid valves 94 is de-excited, and the fast-acting solenoid valve 94 trips due to the action of the spring of the fast-acting solenoid valve 94. This allows the A-port and the T port of each of the fast-acting solenoid valves 94 to communicate with each other, as illustrated in FIG. 3, and then the hydraulic oil in the X-port of each of the cartridge valves 89 is discharged to the discharge port 81 via the A-port and the T-port of the fast-acting solenoid valve 94 and via the B-port of the cartridge valve 89. At this time, the hydraulic oil in the X-port is discharged from the B-port of the cartridge valve 89 to the discharge port 81 through a portion of the discharge-side communication line 90 and through the discharge port-side line 92. This allows the valve body 89a of each of the cartridge valves 89 to move by the pressure of the hydraulic oil supplied to the A-port, so as to open each of the cartridge valves 89. Since the X-port of each of the cartridge valves 89 communicates with the solenoid valve-side communication line 93 at this time, occurrence of a pressure difference between the X-ports of the two cartridge valves 89 is suppressed. This allows synchronization of the movements of the valve bodies 89a of the two cartridge valves 89, making it possible, to simultaneously open the two cartridge valves 89.

Opening each of the cartridge valves 89 will allow communication between the A-port and the B-port of the cartridge valve 89. This will allow the hydraulic oil in the corresponding open-side cylinder chamber 65 of the hydraulic cylinder 60 to be discharged to the discharge port 81 via the cartridge valve 89. Since the B-port of each of the cartridge valves 89 communicates with the discharge-side communication line 90, occurrence of a pressure difference between the B-ports of the two cartridge valves 89 is suppressed. Therefore, the two piston rods 63 can be synchronized in their movements and moved simultaneously.

At this time, a portion of the hydraulic oil discharged from the cartridge valve 89 is supplied to the rod-side cylinder chamber 64 of the hydraulic cylinder 60 via the corresponding rod-side line 91. Accordingly, even when there is fluid resistance in a channel of the discharge port-side line 92, the hydraulic oil discharged to the cartridge valve 89 can flow into the rod-side cylinder chamber 64, which is a relatively large space, making it possible to rapidly discharge the hydraulic oil from the open-side cylinder chamber 65. The hydraulic oil supplied to the rod-side cylinder chamber 64 is thereafter discharged from the discharge port 81.

When the steam valve 31 is rapidly closed, an electrical signal in the closing direction is input to the coil 82a of the servo valve 82. In this case, as illustrated in FIG. 3, the P-port and the B-port of the servo valve 82 are shut off, and this blocks the supply of hydraulic oil from the supply port 80 to the open-side cylinder chamber 65. Furthermore, since the B-port and the T port of the servo valve 82 communicate with each other, a portion of the hydraulic oil in the open-side cylinder chamber 65 of each of the hydraulic cylinders 60 is discharged to the B-port of the cartridge valve 89 via the B-port and the T port of the servo valve 82. This makes it possible to assist the discharge of the hydraulic oil.

This leads to the loss of the pressing force received by the piston 62 of the hydraulic cylinder 60 from the hydraulic oil, and the valve body 34 moves downward by the spring force of the closing spring 50. In this manner, it is possible to rapidly close the steam valve 31.

When the steam valve 31 is rapidly closed, the hydraulic oil in the open-side cylinder chamber 65 is discharged from the cartridge valve 89 having a large discharge capacity, making it possible to rapidly discharge the hydraulic oil within the open-side cylinder chamber 65. This enables the valve body 34 to rapidly move in the closing direction by the spring force of the closing spring 50, making it possible to rapidly close the steam valve 31.

Meanwhile, during operation of the steam turbine plant 1, as illustrated in FIG. 2, high-temperature and high-pressure steam fills (or flows) in the valve casing 32 of the steam valve 31. The vapor rises in the gap between the valve rod 35 and the stand 37 and is mostly collected in the valve rod leak-off line 38, except for a portion of the steam discharged upward from the stand 37 to the outside. However, the packing 67 for suppressing the leakage of hydraulic oil from the gap between the piston rod 63 and the bush 66 of the hydraulic cylinder 60 is disposed at the upper end of the cylinder main body 61. Because of this, the packing 67 is away from the stand 37 from which the leak steam is released. Therefore, it is possible to suppress exposure of the bush 66 of the hydraulic cylinder 60 to high-temperature leak steam, leading to suppression of deterioration of the packing 67.

In this manner, according to the present embodiment, the open-side cylinder chamber 65 having supply of high-pressure hydraulic oil is provided on the opposite side of the piston rod 63 with respect to the piston 62. This makes it possible to achieve a configuration of the open-side cylinder chamber 65 as a sealed space in which there are no components or structures extending outside the cylinder main body 61, leading to suppression of leakage of the hydraulic oil from the open-side cylinder chamber 65 to the outside. Furthermore, since the valve body 34 is pressed in the closing direction by the closing spring 50, it is possible to make it unnecessary to supply high-pressure hydraulic oil to the rod-side cylinder chamber 64 through which the piston rod 63 penetrates. This makes it possible to suppress the leakage of hydraulic oil from the hydraulic cylinder 60 to the outside. This leads to further enhancement of the reliability of the steam valve driving apparatus 40.

Furthermore, according to the present embodiment, the piston rod 63 of the hydraulic cylinder 60 that presses the valve body 34 in the opening direction extends upward from the piston 62 (the side opposite to the valve body 34) to the outside of the cylinder main body 61. This allows the piston rod 63 to extend upward from the upper end of the cylinder main body 61 to the outside. This makes it possible to dispose the portion where the piston rod 63 extends to the outside (the portion corresponding to the bush 66) away from the steam valve 31, leading to suppression of the exposure to the high-temperature leak steam leaking from the steam valve 31. This enables suppression of the deterioration of the packing 67 provided in the portion, making it possible to suppress the leakage of the hydraulic oil to the outside from around the piston rod 63 of the hydraulic cylinder 60. Consequently, it is possible to further enhancement of the reliability of the steam valve driving apparatus 40.

Furthermore, according to the present embodiment, the hydraulic cylinder 60 is disposed above the closing spring 50. With this configuration, it is possible to dispose the portion where the piston rod 63 extends to the outside at a further distant position from the steam valve 31, leading to further suppression of exposure to high-temperature leak steam that leaks from the steam valve 31.

Furthermore, according to the present embodiment, the two hydraulic cylinders 60 are arranged around joint rod 70 when viewed in the axial direction of the joint rod 70. This enables arrangement of the two hydraulic cylinders 60 with good space efficiency, making it possible to suppress enlargement of the steam valve driving apparatus 40.

Furthermore, according to the present embodiment, the two hydraulic cylinders 60 are arranged evenly in the circumferential direction of the joint rod 70 when viewed in the axial direction of the joint rod 70. This makes it possible to suppress uneven transmission of the pressing force of the hydraulic cylinder 60 to the joint rod 70. This makes it possible to smoothly move the joint rod 70 when opening the steam valve 31.

Furthermore, according to the present embodiment, the piston rod 63 of each of the hydraulic cylinders 60 is joined to the joint rod 70 via the joint plate 71, with the joint plate 71 disposed above the piston rod 63. This allows the piston rod 63 extending outward from the upper end of the cylinder main body 61 to be easily joined to the joint plate 71.

Furthermore, according to the present embodiment, the servo valve 82 communicates with the supply-side communication line 85 via the supply line 86, and the supply-side communication line 85 communicates with the open-side cylinder chambers 65 of the two hydraulic cylinders 60. Accordingly, high-pressure hydraulic oil can be individually supplied from one servo valve 82 to the two open-side cylinder chambers 65, suppressing occurrence of a pressure difference in each of the open-side cylinder chambers 65. Therefore, the two piston rods 63 can be synchronized in their movements and moved simultaneously when opening the steam valve 31. This result in smooth movement of the joint rod 70, making it possible to smoothly open the steam valve 31.

Furthermore, according to the present embodiment, the discharge-side communication line 90 communicates with the B-port of each of the cartridge valves 89 for discharging the hydraulic oil. This makes it possible to suppress the occurrence of a pressure difference between the B-ports of the two cartridge valves 89. Therefore, the two piston rods 63 can be synchronized in their movements and moved simultaneously when closing the steam valve 31. This makes it possible to smoothly move the joint rod 70, leading to smooth closing of the steam valve 31.

Furthermore, according to the present embodiment, the solenoid valve-side communication line 93 communicates with the X-port of each of the cartridge valves 89 which communicates with the fast-acting solenoid valve 94. This enables suppression of the occurrence of a pressure difference at the X-ports of the two cartridge valves 89, allowing synchronization of the movements of the valve bodies 89*a* of the two cartridge valves 89, making it possible to simultaneously open the two cartridge valves 89. When the steam valve 31 is in the open state, the valve body 89*a* of the cartridge valve 89 can be stably maintained at a position where the A-port and the B-port are shut off. When the steam valve 31 is rapidly closed, it is possible to simultaneously open each of the cartridge valves 89, leading to achievement of simultaneous discharge of the hydraulic oil in each of the open-side cylinder chambers 65.

Furthermore, according to the present embodiment, the manifold block 95, which internally includes various lines such as a supply-side communication line 85, various valves 82, 89, and 94 including the servo valve 82, and the filters 84 and 88 or the like, is attached to the hydraulic cylinder 50. This leads to stabilization of the support of the manifold block 95.

The above-described embodiment is an example in which one cartridge valve 89 and one fast-acting solenoid valve 94 are combined with one hydraulic cylinder 60. However, the present invention is not limited to this. Two or more cartridge valves 89 and two or more fast-acting solenoid valves 94 may be combined with respect to one hydraulic cylinder 60 depending on the capacity of the hydraulic cylinder 60 and the required operation time.

Furthermore, the present embodiment described above is an example in which the servo valve 82 includes one coil 82*a*. However, the present invention is not limited to this, and electrical signals transmitted from the control device may be received by a plurality of coils. In this case, reliability can be improved. The similar applies to the fast-acting solenoid valve 94.

Furthermore, the present embodiment described above is an example in which the servo valve 82 having a spool valve position control function is adopted as a supply-side control valve that permits or blocks the supply of the hydraulic oil to the open-side cylinder chamber 65 of each of the hydraulic cylinders 60. However, the present invention is not limited to this, and the supply-side control valve may be a simplified solenoid valve having an on/off function (for example, a solenoid value such as a fast-acting solenoid valve 94) even without a position control function.

Furthermore, the above-described embodiment is an example in which the steam valve driving apparatus 40 includes the two hydraulic cylinders 60. However, the present invention is not limited to this, and the steam valve driving apparatus 40 may include three or more hydraulic cylinders 60. In this case, three or more hydraulic cylinders 60 may be evenly arranged in the circumferential direction around the joint rod 70. In this case, one cartridge valve 89 and one fast-acting solenoid valve 94 may also be combined with one hydraulic cylinder 60. Furthermore, the hydraulic oil may be supplied from one servo valve 82 to each of the three or more hydraulic cylinders 60.

According to the above-described embodiment, leakage of hydraulic oil from the hydraulic cylinder can be suppressed, leading to improvement of reliability.

While certain embodiments have been described, these embodiments have been presented by way of example only, and are not intended to limit the scope of the inventions. Indeed, the novel embodiments described herein can be embodied in a variety of other forms; furthermore, various omissions, substitutions and changes in the form of the embodiments described herein can be made without departing from the spirit of the inventions. The accompanying claims and their equivalents are intended to cover such forms or modifications as would fall within the scope and spirit of the inventions. In addition, as a matter of course, these embodiments can be combined partly and arbitrarily within the spirit of the present invention.

The invention claimed is:

1. A steam valve driving apparatus regulating open and close position of a valve body, the apparatus comprising:
    a plurality of hydraulic cylinders that presses the valve body in an opening direction, each of the hydraulic cylinders including a piston rod extending outward from a piston to an opposite side of the valve body, and an open-side cylinder chamber arranged in a side opposite of the piston rod with respect to the piston and to which hydraulic oil is supplied; and
    a joint rod that joins the piston rod of each of the hydraulic cylinders to the valve body,
    wherein the joint rod penetrates through a closing spring pressing the valve body in a closing direction,
    the hydraulic cylinder is disposed on a side opposite to the valve body with respect to the closing spring, and
    the hydraulic cylinders are disposed around the joint rod when viewed in an axial direction of the joint rod.

2. The steam valve driving apparatus according to claim 1,
    wherein the hydraulic cylinders are arranged evenly in a circumferential direction of the joint rod when viewed in the axial direction of the joint rod.

3. The steam valve driving apparatus according to claim 1, further comprising:
    a joint member that joins the piston rod of each of the hydraulic cylinders to the joint rod,
    wherein the joint member is disposed on a side opposite to the valve body with respect to the piston rod.

4. The steam valve driving apparatus according to claim 1, further comprising:
    a supply control valve that permits or blocks supply of the hydraulic oil to the open-side cylinder chamber of each of the plurality of hydraulic cylinders;
    a supply-side communication line that allows the open-side cylinder chamber of each of the plurality of hydraulic cylinders to communicate with each other; and
    a supply line that allows the supply control valve to communicate with the supply-side communication line.

5. The steam valve driving apparatus according to claim 4, further comprising:
    a plurality of discharge control valves that each blocks or permits discharge of the hydraulic oil from the open-side cylinder chamber of the corresponding hydraulic cylinder among the plurality of hydraulic cylinders; and
    a discharge-side communication line that allows each of the plurality of discharge control valves to communicate with each other, wherein the discharge-side communication line communicates with a port of the discharge control valve, the port discharging the hydraulic oil.

6. The steam valve driving apparatus according to claim 5, further comprising:
   a plurality of fast-acting solenoid valve that permits or blocks supply of the hydraulic oil to the corresponding discharge control valve among the plurality of discharge control valves and thereby controls the discharge of the hydraulic oil from the open-side cylinder chamber by the discharge control valve; and
   a solenoid valve-side communication line that allows each of the plurality of discharge control valves to communicate with each other,
   wherein the solenoid valve-side communication line communicates with a pilot port of the discharge control valve, the pilot port communicating with the fast-acting solenoid valve.

7. The steam valve driving apparatus according to claim 6, further comprising:
   a manifold block,
   wherein the supply-side communication line, the supply line, the discharge-side communication line, and the solenoid valve-side communication line are arranged inside the manifold block,
   the supply control valve, the discharge control valve, and the fast-acting solenoid valve are attached to the manifold block, and
   the manifold block is attached to the hydraulic cylinder.

8. A steam valve apparatus comprising:
   a steam valve having a valve body; and
   the steam valve driving apparatus according to claim 1, that performs open/close driving of the valve body of the steam valve by using hydraulic oil.

9. A steam turbine plant comprising:
   a boiler that generates steam;
   a steam turbine that obtains a rotational driving force with the steam generated by the boiler;
   a condenser that condenses the steam discharged from the steam turbine, and
   the steam valve apparatus according to claim 8 that controls a flow of the steam generated by the boiler.

* * * * *